AUGUSTUS F. TRIPP.
Improvement in Dredge Boxes.
No. 4,615. Reissued Oct. 31, 1871.
*Fig. I.*
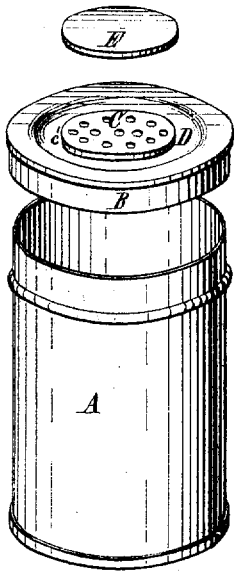
*Fig. II.*
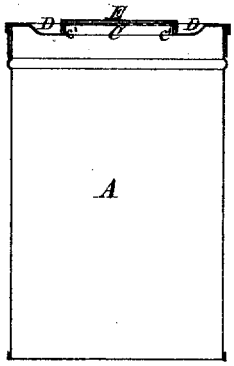
Edward Wilhelm
Jno. J. Sommer } Witnesses
Augustus F. Tripp Inventor.
by Jay Hyatt
Atty.
AM. PHOTO-LITHOGRAPHIC CO. N.Y. (OSBORNE'S PROCESS.)

UNITED STATES PATENT OFFICE.

AUGUSTUS F. TRIPP, OF BUFFALO, NEW YORK, ASSIGNOR TO SIDNEY, SHEPARD & CO.

IMPROVEMENT IN DREDGE-BOXES.

Specification forming part of Letters Patent No. 106,430, dated August 16, 1870; reissue No. 4,615, dated October 31, 1871.

*To all whom it may concern:*

Be it known that I, AUGUSTUS F. TRIPP, of the city of Buffalo, in the county of Erie and State of New York, have invented an Improved Dredge-Box, of which the following is a specification:

The invention relates to that class of dredge-boxes which is provided with secondary covers for the perforated ends, so that they may be used as packing-boxes for putting up spices, &c. I am aware that dredge-boxes, previous to my invention, have been made with a second cap or cover fitting over the whole of the perforated end or main cover of the box in the manner of an ordinary cover. I am also aware that a portion only of the main cover or end of a dredge-box has been perforated, and the perforations closed by pasting a disk of paper or other suitable material over said perforations. I am also aware of certain Letters Patent granted to Charles T. Palmer, September 8, 1868, which shows an annular groove surrounding the central perforated portion of the end of the box; also of a certain other patent granted to the said Palmer June 22, 1868, which shows the central perforated portion depressed and surrounded by an annular bead. These features I do not claim as part of my invention. My invention consists in the combination with a dredge-box of a flanged cap of less diameter than the end of the box and a central perforated portion of one of the ends of the box, or of the main cover thereof when said central portion is made of a size to correspond with said cap, and provided with annular offset, jog, or shoulder that forms a bearing, around which the flange of the cap fits, and by means of which the cap is retained in place over said central perforated portion.

In the accompanying drawing, Figure I is a perspective view of my improved box, showing the parts slightly separated from each other. Fig. II is a vertical section, showing the parts connected.

Like letters of reference designate like parts in each of the figures.

A is the cylindrical body of the box, of usual construction. B represents the principal cover. C is the central perforated portion thereof, and $c'$ is the jog or offset surrounding said central portion C. E is the flanged cap or secondary cover, which fits over the central portion C and closes the perforations therein. The flange of the cap fits snugly over the offset $c'$ so as to securely hold the cap in place. As shown in the drawing, the central portion C is surrounded by an annular groove, D, which enables the offset $c'$ to be formed without causing the portion C to project beyond the outer portion of the cover or end of the box, which thereby enables the boxes to be more closely packed than they could be if this offset was formed by projecting the perforated portion C outward, which would increase by the width of said offset the length of the box. This annular groove, however, I do not claim as an essential feature of my invention. It is obvious that the perforations may as well be made in the permanent end of the box, and that the cap E be applied thereto in the same manner as when they are made in the cover B.

By my improved method of construction the boxes can be made of uniform size at both ends, which enables them to be more closely packed for transportation.

What I claim as my invention is—

The combination, in a dredge-box, of the lesser-flanged cap E, central perforated portion C, and offset $c'$, substantially as and for the purpose hereinbefore set forth.

AUGUSTUS F. TRIPP.

Witnesses:

EDWARD WILHELM,

JNO. J. BONNER.

(88)